March 27, 1956 F. W. MEREDITH 2,739,771
STABILIZATION AND STEERING DEVICES FOR DIRIGIBLE CRAFT
Filed Jan. 23, 1952 6 Sheets-Sheet 1

F. W. MEREDITH
Inventor

By Moore & Hall
Attorneys

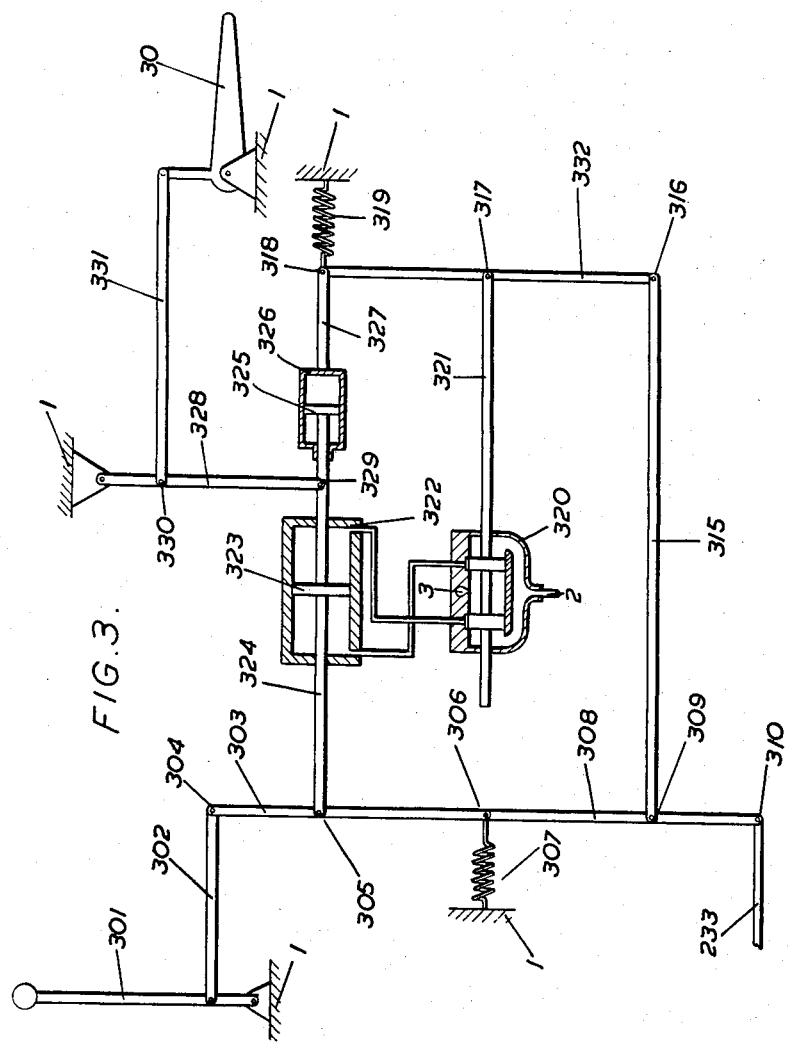

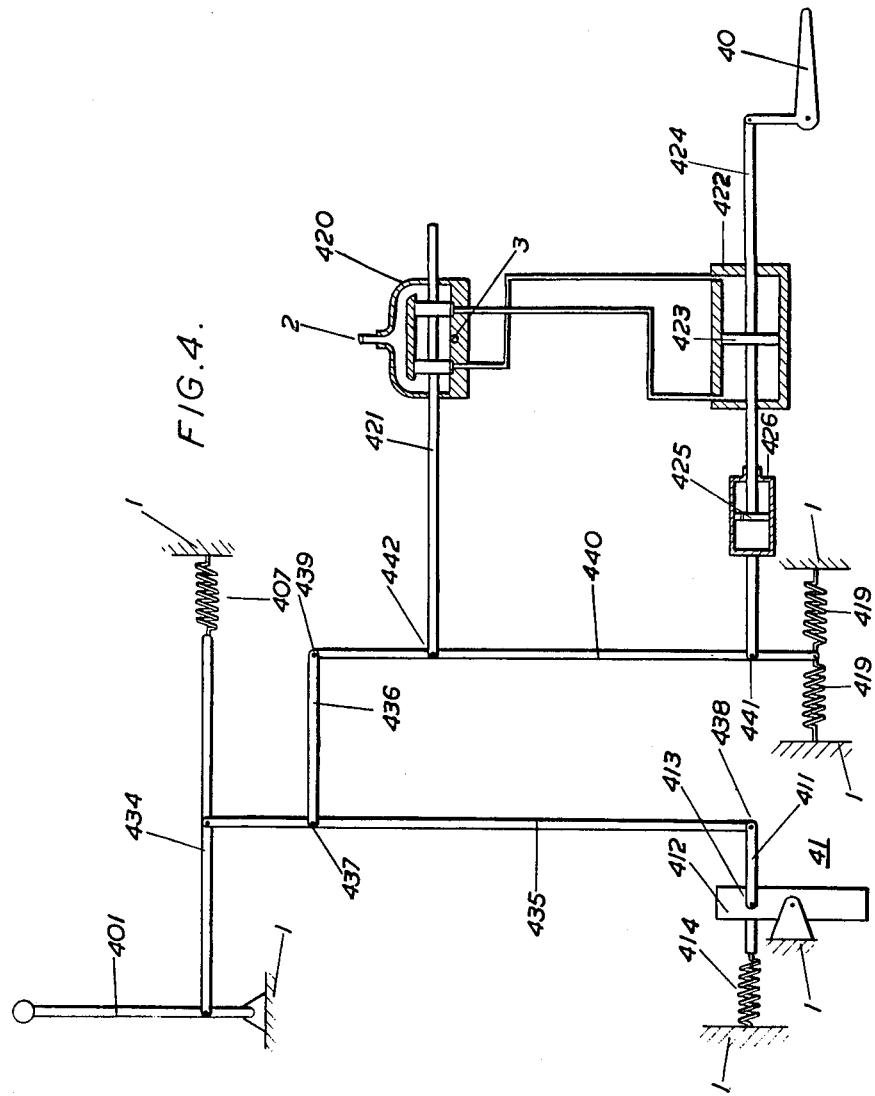

March 27, 1956     F. W. MEREDITH     2,739,771
STABILIZATION AND STEERING DEVICES FOR DIRIGIBLE CRAFT
Filed Jan. 23, 1952     6 Sheets-Sheet 5

F.W. MEREDITH
Inventor

By Moore & Hall
Attorneys

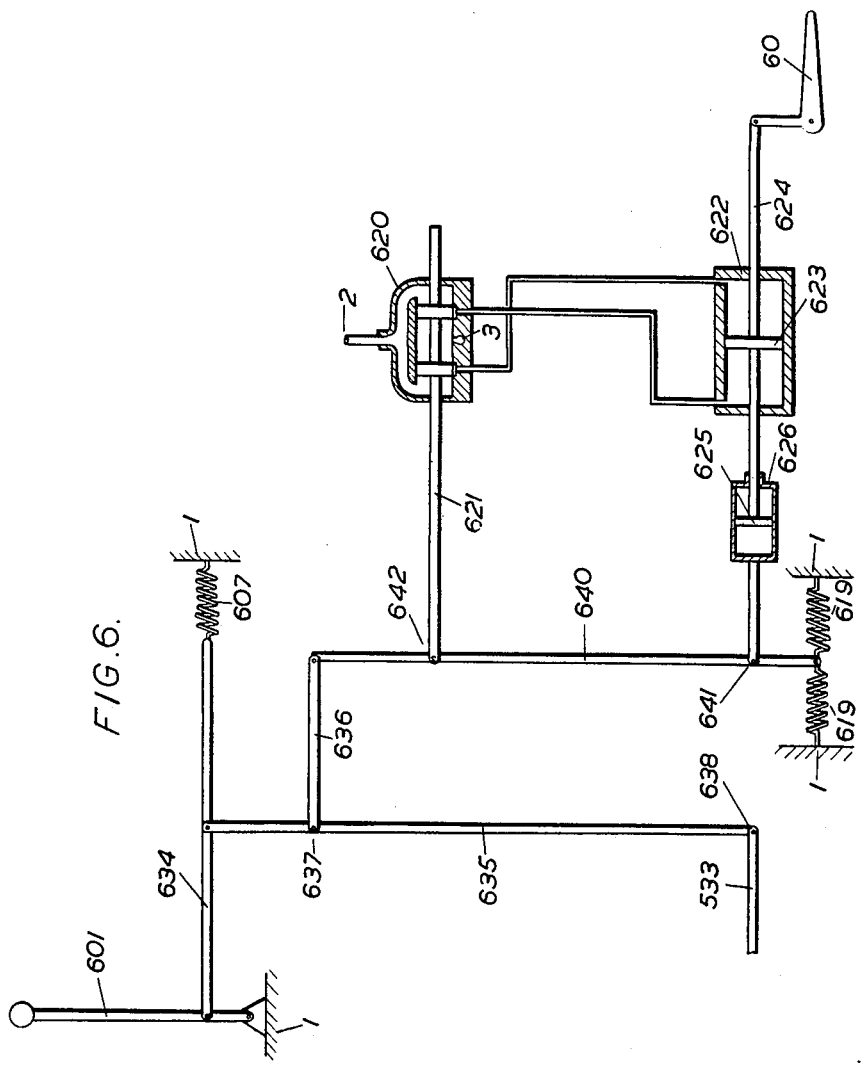

United States Patent Office 2,739,771
Patented Mar. 27, 1956

2,739,771

STABILIZATION AND STEERING DEVICES FOR DIRIGIBLE CRAFT

Frederick William Meredith, Cheltenham, Gloucestershire, England, assignor to S. Smith & Sons (England) Limited, London, England Application January 23, 1952, Serial No. 267,727

6 Claims. (Cl. 244—79)

This invention relates to combined stabilization and steering devices for moving craft and is more particularly concerned with the provision of such devices for aircraft.

It is an object of the present invention to provide a combined stabilization and steering device for moving craft wherein so long as no control effort is exerted by the pilot a purely damping control to damp motion of the craft about or away from its desired track is obtained, while exertion of control effort by the pilot produces rate of turn of the craft in accordance with the control effort.

In accordance with the present invention I provide. for the actuation of a control surface adapted to steer and stabilize a craft about a control axis, a servomotor, a control member (i. e. a steering wheel, rudder bar or the like), an instrument giving a response substantially proportional to the rate of turn of the craft about the control axis, a device giving a further response dependent upon the displacement of the control surface from its position for a constant course, said servomotor being energised in accordance with the algebraic sum of quantities respectively proportional to the force applied to the control member, the aforesaid response and the aforesaid further response, whereby if the effort exerted upon the control member is zero, the control surface is actuated so as to damp the motion of the craft about said axis, while if a non-zero effort is applied to the control member the craft is caused to turn about said axis at a rate in accordance with that effort.

Preferably the further response is substantially proportional to a long term transient of the displacement of the control surface from its position for a constant course.

By a "long term transient" of a quantity is meant a further quantity obtained by the application of an operator of the form $$\frac{t_1 D}{1+t_1 D}$$

to the quantity where D represents the operator of differentiation with respect to time $$\left(\frac{d}{dt}\right)$$

and $t_1$ is a constant having the dimension of time and large compared with the short periods of oscillatory motion of the aircraft about its control axes. A displacement which is a long-term transient of the control surface displacement may be obtained by means of a dashpot whose piston is moved in accordance with servomotor displacement and whose cylinder is resiliently anchored to the craft, when the displacement of the cylinder relative to the craft provides the required long-term transient. The constant $t_1$ will then be the time-constant of the dashpot.

In accordance with a further feature of the invention the servomotor is of the hydraulic type, the control member is connected through resilient means to the aircraft frame to give a first displacement substantially proportional to the effort applied thereto, the device responsive to the rate of turn of the craft is a gyroscope having one precessional degree of freedom against a spring restraint, its spin and precession axes being at right angles to each other and the control axis, this displacement, the second displacement, against the spring restraint thus constituting the response, according to the invention, and a mechanical linkage is provided whereby the valve controlling the flow of fluid to the servomotor is displaced from its central, closed, position in accordance with the algebraic sum of multiples of the first and second displacements and a long term transient of the control surface displacement.

When the invention is applied to the control of an aircraft in pitch, the elevator servomotor is controlled by the algebraic sum of quantities substantially proportional respectively to:

(i) The effort applied to a control member, (ii) the rate of turn of the aircraft about the pitch axis, (iii) a long term transient of the elevator displacement. Thus when no effort is applied to the control member the system operates to apply elevator displacement in accordance with rate of pitch in such a sense as to damp any pitching oscillation. Also, so long as the elevator displacement is small, the rate of pitch is maintained substantially proportional to the effort applied to the control column. Finally, in the absence of rate of pitch, the effort applied to the control column provides a measure of elevator displacement, except that, because the feed-back in accordance with elevator displacement is transientised, the system is self-trimming i. e. any effort required to maintain zero rate of pitch will decay slowly to zero.

When the invention is applied to the steering of an aircraft, the control axis is the azimuth axis and the control surface is constituted by the ailerons, the rudder being utilised as a yaw damping organ. The aileron servomotor is preferably controlled by the algebraic sum of quantities substantially proportional respectively to:

(i) The force applied to a control column.
(ii) The rate of turn of the aircraft about the yaw or azimuth axis.
(iii) A long term transient of the aileron displacement.

Thus when no effort is applied to the control member aileron angle is applied in such a sense as to reduce the angle of bank associated with the rate of turn. Also, so long as the aileron angle is small, the rate of turn is maintained substantially proportional to the effort applied to the control column. Finally in the absence of rate of turn the effort applied to the control member provides a measure of aileron angle except that, because the feed-back of the aileron angle is transientised, the system is self-trimming.

The rudder servomotor may be controlled by the algebraic sum of quantities substantially proportional respectively to:

(i) The force applied to the control column.
(ii) The rate of turn of the aircraft.
(iii) The effort applied to a rudder bar.
(iv) A long term transient of the rudder displacement.

Thus, when no force is applied to either the control column or the rudder bar, rudder displacement proportional to rate of yaw is applied to damp any oscillation in yaw. Also if a force is applied to the control column and no force is applied to the rudder bar, a rudder displacement is applied which is proportional to the difference between the rate of yaw and the rate of yaw demanded by the force applied to the control column. Oscillations in yaw are thus damped, while a turn at a desired rate is possible without effort on the rudder bar.

Alternatively the rudder may be controlled by the algebraic sum of quantities respectively proportional to:

(i) The aileron displacement.
(ii) The force applied to a rudder bar.

(iii) A long term transient of the rudder displacement.

This gives substantially the same effect as the rudder control previously mentioned, except for the lag introduced by the servomotor and valve actuating the ailerons.

Embodiments of the invention will now be described with reference to the accompanying drawings of which—

Figures 2 and 3 show a hydraulically operated system for the control of the ailerons and rudder of an aircraft in accordance with the first form of the invention, Figure 2 showing the portion actuating the ailerons, which also provides an input to the rudder portion, and Figure 3 the portion solely concerned with actuating the rudder;

Figure 4 shows a hydraulically operated system for the control of the elevators of an aircraft in accordance with a second form of the invention, and Figures 5 and 6 show a hydraulically operated system for the control of the ailerons and rudder of an aircraft in accordance with the second form of the invention, Figure 5 showing the portion actuating the ailerons, which also provides an input to the rudder actuating portion, and Figure 6 the portion solely concerned with actuating the rudder.

Figure 1:
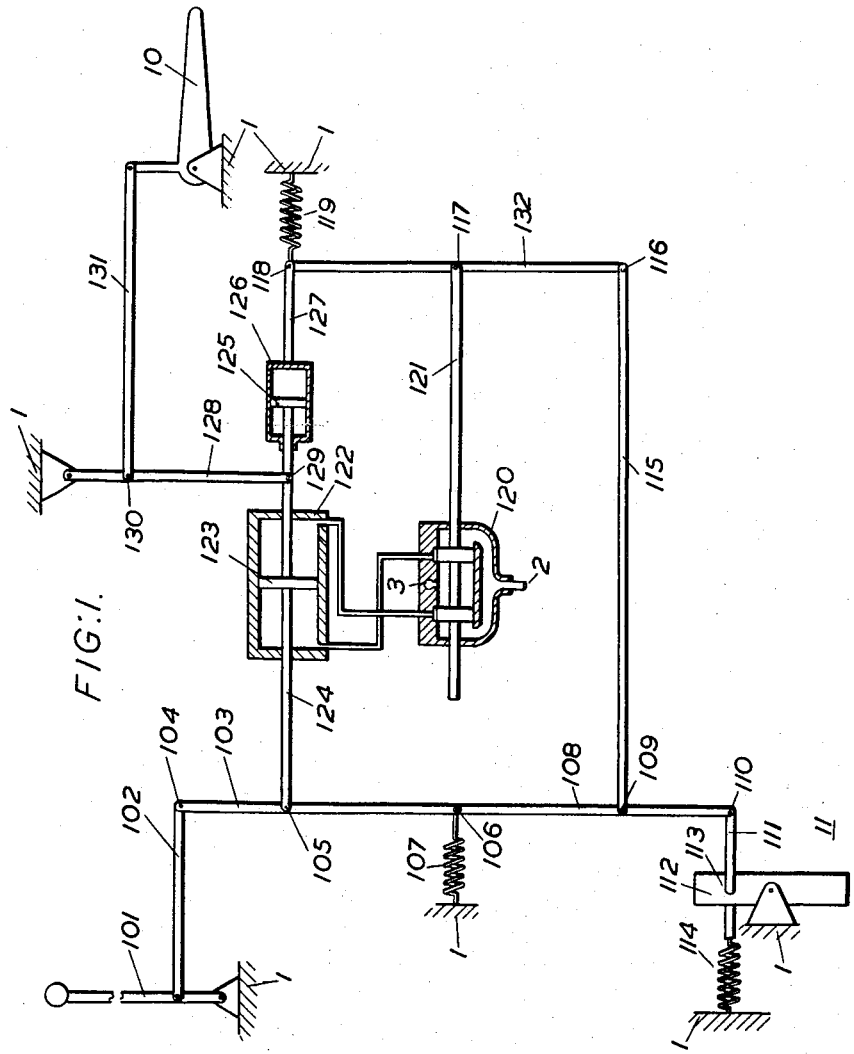
Figure 1 shows a hydraulically operated system for the control of the elevators of an aircraft in accordance with a first form of the invention.

Referring to Figure 1, the elevator 10 is controlled jointly by a control column, conventionally indicated at 101 and a rate of pitch gyroscope indicated at 11, by means of a hydraulic cylinder and piston, indicated at 122 and 123 respectively.

The elevator control column 101 is pivoted at one end to the aircraft frame, indicated at 1, and is connected by means of a link 102 to one end (104) of an arm 103. The other end (106) of the arm 103 is anchored to the frame 1 through a spring 107, while a point 105 on 103 adjacent to 104 is pivotally connected to the piston rod 124 to which piston 123 is attached. The rate of pitch gyroscope 11 is of a well known kind and comprises a rotor (not shown), mounted for rotation about its spin axis in a gimbal ring 112, which in turn is mounted for precessional movement about an axis at right angles to the spin axis in brackets attached to the aircraft frame 1. A spring 114 attached at one end to ring 112 and at the other end to frame 1 provides a resilient restraint against a precessional movement. The plane of the spin and precession axes is, in the position in which spring 114 is unstressed, at right angles to the pitch axis of the aircraft, so that, upon occurrence of a rate of turn in pitch, ring 112 is precessed from this position through an angle proportional to the rate of turn in pitch. Gimbal ring 112 is pivoted at 113 to a link 111 through which it is connected to one end 110 of a second arm 108 whose other end is connected to arm 103 at 106. An intermediate point 109 of arm 108 is connected through a link 115 to one end (116) of a third arm 132 whose other end 118 is anchored to the aircraft frame by a spring 119 and connected through link 127 to the cylinder 126 of a liquid-filled dashpot. The piston 125 of the dashpot is connected to the piston rod 124. An intermediate point 117 of arm 132 is connected to the operating rod 121 of a hydraulic valve 120 controlling the flow of pressure fluid from a source indicated at 2 to the cylinder 122 and from the cylinder to a reservoir via a passage 3. The piston rod 124 is pivoted at 129 to one end of a fourth arm 128 which is pivoted at the other end to the aircraft frame 1. Arm 128 is connected through a link 131 to the elevator 10.

Figure 2:
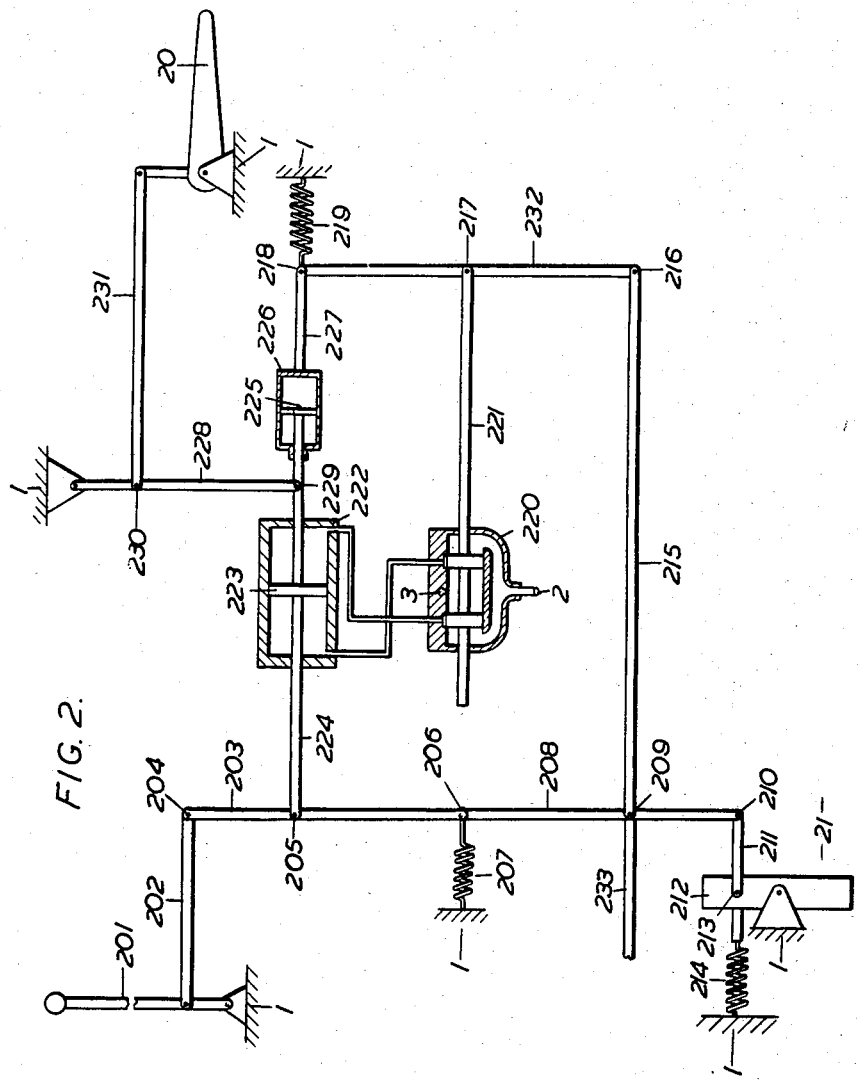

Referring to Figure 2 the ailerons indicated at 20 are controlled jointly by a control column conventionally indicated at 201 and a rate of yaw gyroscope having its spin and precession axes at right angles to each other and to the yaw axis of the aircraft, indicated at 21 by means of a hydraulic cylinder and piston indicated at 222 and 223 respectively. Components bearing numbers 201–232 inclusive correspond precisely with those bearing numbers 101–132 in Figure 1 and so will not be further described. An additional link 233 is provided between point 209 and the rudder control.

Referring to Figure 3 the rudder indicated at 30 is controlled jointly by a rudder bar, indicated at 301 and the displacement of link 233. Components 301—310 and 315—332 correspond precisely with those bearing numbers 101—110 and 115—132 in Figure 1 and so will not be further described. Link 233 is connected to end 310 of arm 308.

The operation of the system will now be described, commencing with the elevator control (Fig. 1).

If P denotes the force applied to the control column, $q$ the rate of pitch of the aircraft, $\eta$ the elevator servo displacement, $t_1$ denotes the time-constant of dashpot 126, the displacement of valve 120 from its zero position will be proportional to the sum of multiples of the displacement of points 106, 110, and 118. These are respectively proportional to the force applied to column 1 (acting against spring 107), the rate of pitch of the aircraft, and a long-term transient of the elevator servo displacement (obtained by the action of dashpot 126 and spring 119). It is thus equal to $$aP + bq + \frac{ct_1 D\eta}{1 + t_1 D}$$

where $a$, $b$, $c$ are constants depending upon the geometry of the linkage, the rates of the various springs etc.

As the system operates to keep the valve closed i. e. to keep the valve at its zero position we have $$aP + bq + \frac{ct_1 D\eta}{1 + t_1 D} = 0$$

This implies the following results:

(i) So long as $P = 0$ $$\eta = -\frac{b}{c}\left(q + \frac{1}{t_1}\int q\,dt\right)$$

It is well known that a control in accordance with an equation of this kind results in a self-zeroing damping control of the aircraft.

(ii) So long as $\eta = 0$ (i. e. the servo displacement is zero, as it will be averaged over an appreciable period)

$$q = -\frac{aP}{b}$$

i. e. the rate of turn in pitch is proportional to the effort exerted on the control column.

(iii) During the application of considerable sudden control moments by manipulation of the control column the elevator displacement will be felt at the control column (as the term $bq$ in the above equation will then be small compared with the other two terms), so the risk of accidental over-stressing of the elevator and tail plane will be reduced. The position of the anchorage of spring 119 is adjusted to ensure that when zero force is applied to the control column 101 and there is zero rate of pitch, valve 120 is in its zero position. Thus, when no force is applied to the control column the aircraft attains a state of motion with zero rate of pitch.

Referring to Figure 2 steering of the aircraft in yaw is effected through the operation of the ailerons in a similar manner to that described above, except that the angle of roll, controlled by the ailerons, is used to determine the rate of turn in yaw, by virtue of the relationship between the angle of bank of a turning aircraft and its rate of yaw.

Referring to Figure 3, it will be seen that the rudder is actuated in accordance with the difference between the actual rate of turn and the rate of turn demanded by the pilot's effort on column 201. Thus in the absence of any force on the rudder-bar 301 the rudder is operated to enhance the damping of any yaw oscillation about the demanded value of rate of turn.

When the pilot applies a steady force to the aileron control column 201, a steady rate of turn proportional to the force is achieved and the yaw damping function of the rudder is maintained, but the rudder is not actuated to resist the steady rate of turn in yaw when no force is applied to the rudder bar, the rudder being only actuated (by reason of movement of point 209 and link 233 from their zero position) when the actual rate of turn in yaw differs from the demanded rate. The rudder actuation in these circumstances is such as to make the actual and demanded rates in turn in yaw equal.

Usually an aircraft will execute a correctly co-ordinated turn under these conditions because of its weathercock stability in yaw. If this stability is deficient, the rudder bar may be required to be operated to ensure zero side-slip.

It will be appreciated that, in this embodiment, the interconnection of the servomotors and pilot's controls is such that repeat back movement occurs from the servomotors to the pilot's controls and manual reversion is provided in the event of servo failure.

Referring to Figure 4, the elevator 40 is controlled jointly by a control column indicated at 401 and a rate of pitch gyroscope, indicated at 41 by means of a hydraulic cylinder and piston, indicated at 422 and 423 respectively.

The elevator control column 401 is pivoted at one end to the aircraft frame 1 and is connected by a link 434 to one end of a spring 407 whose other end is anchored to the frame 1. A point on link 434 is connected to one end of a first arm 435 whose other end 438 is connected to the gimbal ring of gyroscope 41. The parts numbered 411—414 associated with gyroscope 41 correspond precisely with parts 111—114 associated with gyroscope 11 and will not be further discussed. An intermediate point 437 on arm 435 is connected through a further link 436 to one end (439) of a second arm 440. The other end of arm 440 is anchored to the frame 1 through centering springs 419. A point 441 adjacent the anchored end of arm 440 is connected to the cylinder 426 of a dashpot whose piston is connected to the piston 423. The supply of pressure fluid to the cylinder 422 is controlled by valve 420 whose operating rod 421 is connected to an intermediate point 442 on arm 440. Components numbered 420—426 correspond precisely with components 120—126 of Figure 1 and will not be further discussed.

Referring to Figure 5, showing the aileron control system, the ailerons, indicated at 50 are controlled jointly by a control column indicated at 501 and a rate of yaw gyroscope indicated at 51 by means of a hydraulic cylinder and piston indicated at 522 and 523 respectively. Components bearing numbers 501, 507, 511—514, 519—526 and 534—542 correspond precisely with components bearing numbers 401, 407, 411—414, 419—426 and 434—442 shown in Figure 4 and will not be further discussed. A link 533 is provided attached to arm 540 at point 551 and thus displaced through a distance equal to the displacement of the dashpot cylinder 526.

Referring to Figure 6, showing the rudder control system, the rudder, indicated at 60, is controlled jointly by means of a rudder bar, indicated at 601, and the displacement of link 533 by means of a hydraulic cylinder and piston, indicated at 622 and 623 respectively. Components bearing numbers 607, 619—626 and 634—642 correspond precisely with components bearing numbers 407, 419—426 and 434—442 shown in Figure 4 and will not be further discussed.

It will be seen that the embodiment of Figures 4–6 functions in a manner closely similar to that of Figures 1–3. The operation of the elevator is governed by a similar equation in both cases, and the operation of the ailerons is also similar. In the second embodiment however the displacement of the link 533 between aileron and rudder channels is proportional to a long term transient of the aileron servo displacement. This lags on the difference between demanded and actual rate of turn, but greater power (that of the aileron servo) is available for making the displacement.

It will also be seen that in the second embodiment a restrain applied to by the pilot to controls 401, 501, or 601 will not affect the damping provided by the control, as it will that provided in the first embodiment. Also no manual reversion is provided in the second embodiment in the event of power failure.

I claim:

1. A system for the actuation of the ailerons and rudder of an aircraft comprising a first hydraulic servomotor adapted to actuate the ailerons, a first valve controlling the flow of pressure fluid to said first servomotor, a first control member, first displaceable resilient means connecting said first control member to the aircraft frame, the displacement of said means comprising a first displacement for providing a measure of the force applied to said first control member, a spring-restrained gyroscope mounted in the aircraft and adapted to provide a second displacement proportional to the rate of turn in yaw of the aircraft, a first spring-restrained dashpot coupled to the ailerons and adapted to provide a third displacement proportional to a long-term transient of the aileron displacement, a first linkage connecting said first resilient means, said gyroscope, first dashpot, and said first valve to apply to said valve a displacement proportional to the sum of multiples of said first, second, and third displacements, a second hydraulic servomotor adapted to actuate the rudder, a second valve controlling the flow of pressure fluid to said second servomotor, a second control member, second displaceable resilient means connecting said second control member to the aircraft frame, the displacement of said second resilient means comprising a fourth displacement for providing a measure of the force applied to the said second control member, a second spring-restrained dashpot coupled to the rudder and adapted to provide a fifth displacement proportional to a long-term transient of the rudder displacement, and a second linkage connecting said first resilient means, said gyroscope, said second resilient means, said second dashpot and said second control valve to apply to said second valve a displacement proportional to the sum of multiples of said first, second, fourth and fifth displacements.

2. A system for the actuation of the ailerons and rudder of an aircraft comprising a first hydraulic servomotor adapted to actuate the ailerons, a first valve controlling the flow of pressure fluid to said first servomotor, a first control member, first displaceable resilient means connecting said first control member to the aircraft frame, the displacement of said means comprising a first displacement for providing a measure of the force applied to said first control member, a spring-restrained gyroscope mounted in the aircraft and adapted to provide a second displacement proportional to the rate of turn in yaw of the aircraft, a first spring-restrained dashpot coupled to the ailerons and adapted to provide a third displacement proportional to a long-term transient of the aileron displacement, a first linkage connecting said first resilient means, said gyroscope, said first dashpot and said first valve to apply to said valve a displacement proportional to the sum of multiples of said first, second, and third displacement, a second hydraulic servomotor adapted to actuate the rudder, a second valve controlling the flow of pressure fluid to said second servomotor, a second control member, second displaceable resilient means connecting said second control member to the aircraft frame, the displacement of said second resilient means comprising a fourth displacement for providing a measure of the force applied to the said second control member, a second spring-restrained dashpot coupled to the rudder and adapted to provide a fifth displacement proportional to a long-term transient of the rudder displacement, and a second linkage connecting said first dashpot, said second resilient means, said second dashpot, and said second control valve to apply to said second valve a displacement proportional to the sum of multiples of said third, fourth, and fifth displacements.

3. A system for the actuation of a control surface of a dirigible craft comprising a pressure-fluid servomotor adapted to actuate the control surface, a valve controlling the flow of pressure fluid to said servomotor, a control member, first displaceable resilient means connecting said control member to the aircraft frame, the displacement of said means comprising a first displacement for providing a measure of the force applied to said control member, a spring restrained gyroscope mounted in the aircraft and adapted to provide a second displacement proportional to the rate of turn of the aircraft about a control axis corresponding to the control surface, a spring-restrained dashpot coupled to the control surface and adapted to provide a third displacement proportional to a long-term transient of the control surface displacement, and a linkage connecting said resilient means, said gyroscope, said dashpot and said valve to apply to said valve a displacement proportional to the sum of multiples of said first, second and third displacements.

4. A system for the actuation of a control surface of a dirigible craft comprising a servomotor adapted to actuate the control surface, a manually operable control member, first displaceable resilient means connecting said control member to the frame of the craft, the displacement of said means providing a first control quantity giving a measure of the force applied to said control member, a rate of turn responsive device mounted in the craft, said device being adapted to provide a second control quantity proportional to the rate of turn of the craft about a control axis corresponding to the control surface, means coupled to the control surface to provide a third control quantity proportional to a long-term transient of the control surface displacement, and means to control the energization of the said servomotor in accordance with the algebraic sum of multiples of said first, second, and third control quantities.

5. A system for the actuation of the rudder and ailerons of an aircraft comprising a first servomotor adapted to actuate the ailerons, a first control member, first displaceable resilient means connecting said first control member to the aircraft frame, the displacement of said means providing a first control quantity giving a measure of the force applied to said first control member, a first rate of turn responsive device mounted in the aircraft, said device being adapted to provide a second control quantity proportional to the rate of turn in yaw of the aircraft, means coupled to the ailerons to provide a third control quantity proportional to a long term transient of the aileron displacement, means to control the energization of said first servomotor in accordance with the algebraic sum of multiples of said first, second and third control quantities, a second servomotor adapted to actuate the rudder, a second control member, second displaceable resilient means connecting said second control member to the aircraft frame, the displacement of said means providing a fourth control quantity giving a measure of the force applied to said second control member, means coupled to the rudder adapted to provide a fifth control quantity proportional to a long-term transient of the rudder displacement and means to control the energization of said second servomotor in accordance with the algebraic sum of multiples of said first, second, fourth and fifth control quantities.

6. A system for the actuation of the rudder and ailerons of an aircraft comprising a first servomotor adapted to actuate the ailerons, a first control member, first displaceable resilient means connecting said first control member to the aircraft frame, the displacement of said means providing a first control quantity giving a measure of the force applied to said first control member, a first rate of turn responsive device mounted in the aircraft, said device being adapted to provide a second control quantity proportional to the rate of turn in yaw of the aircraft, means coupled to the ailerons to provide a third control quantity proportional to a long-term transient of the aileron displacement, means to control the energization of said first servomotor in accordance with the algebraic sum of multiples of said first, second and third control quantities, a second servomotor adapted to actuate the rudder, a second control member, second displaceable resilient means connecting said second control member to the aircraft frame, the displacement of said means providing a fourth control quantity giving a measure of the force applied to said second control member, means coupled to the rudder adapted to provide a fifth control quantity proportional to a long-term transient of the rudder displacement and means to control the energization of said second servomotor in accordance with the algebraic sum of multiples of said third, fourth and fifth control quantities.

References Cited in the file of this patent

UNITED STATES PATENTS

| Number | Name | Date |
|---|---|---|
| 1,967,155 | Moller | July 17, 1934 |
| 2,051,837 | Fischel | Aug. 25, 1936 |
| 2,074,828 | Carlson | Mar. 23, 1937 |
| 2,140,037 | Swisher | Dec. 13, 1938 |
| 2,201,226 | Carlson | May 21, 1940 |
| 2,325,108 | Carlson | July 27, 1943 |
| 2,341,644 | Moller et al. | Feb. 15, 1944 |
| 2,451,263 | Webb | Oct. 12, 1948 |
| 2,464,629 | Young | Mar. 15, 1949 |
| 2,604,613 | Klass | July 22, 1952 |
| 2,678,177 | Chenery et al. | May 11, 1954 |